Dec. 6, 1927.
S. G. HOUSE
1,652,011
RESERVE VALVE FOR FUEL TANKS
Filed March 29, 1927
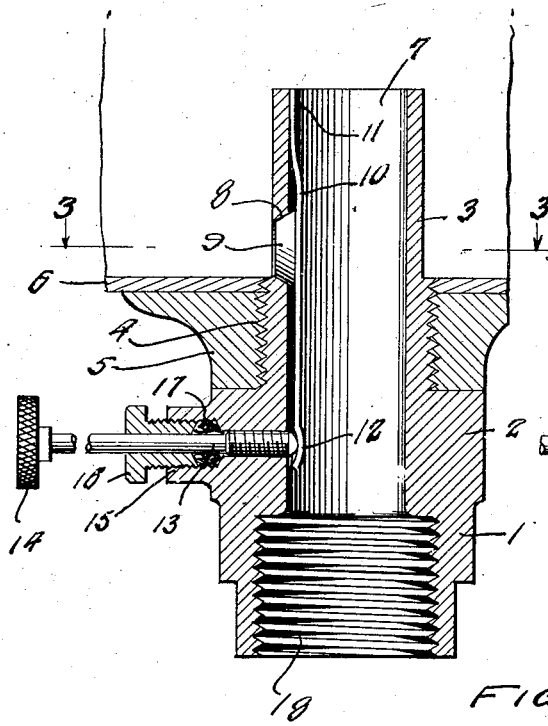
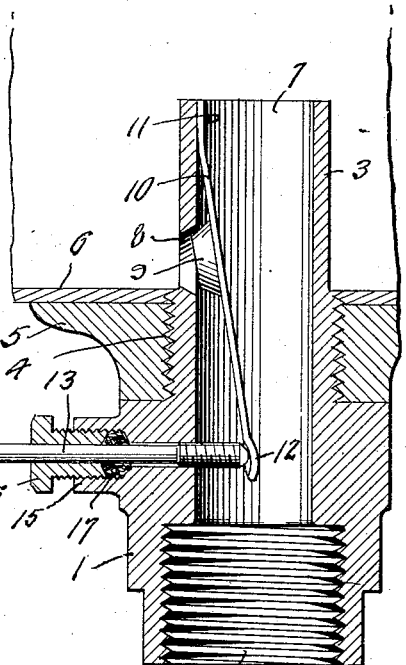
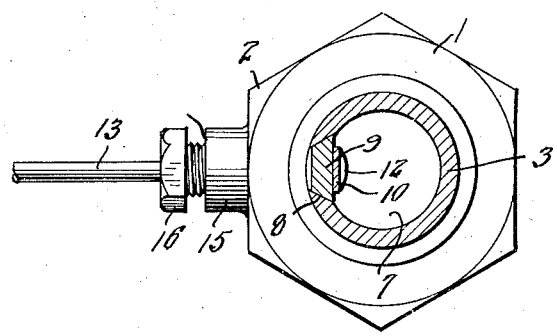
Inventor
SAMUEL G. HOUSE
By R. J. Whitaker
his Attorney Patented Dec. 6, 1927.

1,652,011

UNITED STATES PATENT OFFICE.

SAMUEL G. HOUSE, OF MIAMI, FLORIDA, ASSIGNOR OF ONE-THIRD TO BRAXTON SMALL AND ONE-THIRD TO ALFRED BOYD SMALL, BOTH OF MIAMI, FLORIDA.

RESERVE VALVE FOR FUEL TANKS.

Application filed March 29, 1927. Serial No. 179,376.

This invention relates to fuel tanks, particularly of the gasoline type used on motor vehicle, tractors, and analogous machines; and has for its object the employment of a new reserve valve.

An important object of the invention is to provide a liquid fuel tank with a valve to retain some of the fuel to be used as an emergency reserve.

Another object is to substitute for the common discharge port or valve of the fuel tank, a novel and inexpensive reserve valve.

A still further object of the invention is the provision of a simple device for the fuel tank to create a reservoir and a correspondingly accessible mechanism to utilize said reserve fuel.

The construction used is of standard and uniform size adaptable to all forms of fuel tanks; easy to make; simple to attach, clean, and repair; and inexpensive to manufacture in quantities.

Other objects and advantages of my invention will be apparent from a reading of the following description and claim and as illustrated in the accompanying drawings wherein:—

Figure 1 is a vertical transverse sectional view of the reserve valve showing the reserve port closed.

Figure 2 is a similar sectional view of the valve showing the reserve port open.

Figure 3 is a horizontal cross-sectional view taken on line 3—3 of Fig. 1.

Referring to the drawings in which like characters of reference are employed to designate like parts throughout the same, the numeral 1 designates a virtually cylindrical casting which has provided thereon a hexagonal flange 2. The upper portion 3 is reduced as shown in the drawings and is provided for a portion of its height with screw-threads 4 of similar diameter and pitch as the internal threads of the supply tank 6.

The casting 1 is provided with a central longitudinal bore or passage 7 which extends the entire length of the casting and with a bevelled port, the bottom of which is adjacent the bottom of the tank 6. A tapered valve 9 is provided to close the port 8 and is normally held in engagement with the port by means of a leaf spring 10 which is attached at its upper end 11 to the inner periphery of the passage 7.

The free end of the spring is cup-shaped as at 12 and is adapted to engage one end of the screw-threaded rod 13. The free end of the rod 13 may extend to any easily accessible part of the vehicle and is provided with a thumb screw 14 or any other suitable manual actuating means. To prevent escape of the liquid fuel around the rod 13 there is provided a packing gland 15 fitted with a packing screw 16 and suitable packing material 17.

The lower portion of the passage is slightly enlarged and provided with internal screw-threads 18 which are of the same diameter and pitch as the screw-threads of the boss 5, and are adapted to the reception of the original fitting and feed pipe which were provided for the tank's outlet. It will be clearly understood that since the screw-threads 18, 4 and those of the boss 5 are all of similar diameter and pitch, the casting 1 is interchangeable with the original fitting.

The cylindrical portion 3 extends within the tank 6 for a predetermined distance above the bottom thereof. As the fuel is drawn from the tank 6 it passes out through the passage 7. It will be seen that when the fuel supply reaches the top of the cylinder 3 the flow will cease but there will still be retained a supply fuel in the tank, this remaining supply being equal to the cubic contents of that portion of the tank from the top of the cylinder 3 to the bottom of the tank. When the fuel reaches this level the operator of the vehicle is warned that his tank is empty except for the above mentioned reserve supply. To obtain use of this reserve the operator opens the port 8 by actuating the screw-threaded rod 13 thereby allowing the fuel to feed from the tank through the port 8 and into the passage 7 thence through the regular feed pipe.

It will be seen from the drawings and above description that my invention will provide a device for the purpose of safeguarding the gasoline supply amount at all times and will provide a reserve supply valve that does not cut-down the supply of gasoline, leaving the supply tank. My device is so arranged that the interior of the out-let opening of the fuel tank remains the same in interior size as before installation of the device. The customary methods of construction of such devices have taken the form of a division of the interior of the supply out-let into two separate openings, one of which is permitted to extend up into the supply tank further than the other, which allows the level of the gasoline to drop to the height of the longer or extended opening while the shorter or lower opening remains closed, which is then opened and the remaining amount of gasoline allowed to flow from the supply tank in form of a reserve supply, but the two openings having of necessity been placed within the former single opening the outlet is therefore cut in half as neither opening can possibly be as large as the one opening formerly was, and this naturally must cut down the flow of gasoline from the tank and thereby seriously hampers the operation of the motor which is operated from such gasoline supply, and even if the reserve opening be so constructed as to be so much smaller than the regular outlet to the engine and in so doing enough gasoline is allowed to pass from the tank to run the engine, then the opening of the reserve supply out-let must be so small as to render insufficient supply of gasoline to feed the motor properly when same is running on the reserve supply.

My device provides no change in the diameter of the gasoline supply out-let since the reserve level opening is contained in the side of the reserve supply extension and the interior remains just as it always was, having only one tube extending up into the gasoline supply tank, being much more simple than the double opening affairs as less liable to become clogged with sediment when long in use.

It must be understood that the device is adapted to be used in connection with either a vacuum feed type or gravity type of fuel supply and further that any departure such as in shape, size and arrangement of parts may be resorted to without departing from the spirit of the invention or from the scope of the subjoined claim.

What I claim is:

A valve to drain, to cut off, and to hold an emergency reserve of liquid fuel in a tank, comprising a valve assembly adapted to be substituted for the normal outlet valve of a fuel tank, said assembly having upstanding means to create upper and lower fuel levels in the tank, a bevelled port between the means and the tank, a tapered valve normally held in said port and closing the same, said valve held positioned by a leaf spring fixed to the upstanding means; an extension of the leaf, in combination with a threaded rod, and means on the rod to actuate the rod and the extension whereby the tapered valve may be opened and closed.

SAMUEL G. HOUSE.